(12) United States Patent
Walker et al.

(10) Patent No.: US 7,841,946 B2
(45) Date of Patent: Nov. 30, 2010

(54) SYSTEM FOR REMOTE GAME ACCESS

(75) Inventors: Peter Anthony Walker, Cedar Park, TX (US); Oswald Anthony Becca, Round Rock, TX (US)

(73) Assignee: Spawn Labs, Inc., Austin, TX (US)

(*) Notice: Subject to any disclaimer, the term of this patent is extended or adjusted under 35 U.S.C. 154(b) by 711 days.

(21) Appl. No.: 11/761,168

(22) Filed: Jun. 11, 2007

(65) Prior Publication Data
US 2008/0045338 A1 Feb. 21, 2008

Related U.S. Application Data

(60) Provisional application No. 60/806,233, filed on Jun. 29, 2006.

(51) Int. Cl.
*A63F 9/24* (2006.01)
*A63F 13/00* (2006.01)
*G06F 17/00* (2006.01)

(52) U.S. Cl. .................................................. 463/42

(58) Field of Classification Search ............. 463/40–42
See application file for complete search history.

(56) References Cited

U.S. PATENT DOCUMENTS

| | | | | |
|---|---|---|---|---|
| 5,890,963 | A * | 4/1999 | Yen ............................. | 463/42 |
| 6,315,668 | B1 | 11/2001 | Metke et al. ................... | 463/42 |
| 6,917,984 | B1 * | 7/2005 | Tan ............................. | 709/238 |
| 2001/0016519 | A1 | 8/2001 | Choe ........................... | 463/42 |
| 2002/0022516 | A1 * | 2/2002 | Forden ......................... | 463/32 |
| 2002/0022521 | A1 | 2/2002 | Idaka ........................... | 463/42 |
| 2002/0045484 | A1 | 4/2002 | Eck et al. ...................... | 463/42 |
| 2002/0086730 | A1 | 7/2002 | Nakai ........................... | 463/41 |
| 2002/0151363 | A1 * | 10/2002 | Letovsky et al. .............. | 463/40 |
| 2003/0064808 | A1 | 4/2003 | Hecht et al. ................... | 463/42 |
| 2004/0038740 | A1 | 2/2004 | Muir ........................... | 463/40 |

(Continued)

OTHER PUBLICATIONS

Henderson, Tristan, "Observations on game server discovery mechanisms", Apr. 17, 2002, NetGames 2002.*
"Zoo Tycoon", Nov. 25, 2001, available at <http://web.archive.org/web/20011226173527/www.pibweb.com/review/zootycoon.html>.*

(Continued)

*Primary Examiner*—Dmitry Suhol
*Assistant Examiner*—Werner Garner
(74) *Attorney, Agent, or Firm*—O'Keefe, Egan, Peterman & Enders, LLP

(57) ABSTRACT

A system for allowing a user to remotely access a game includes: a game console; a remote console client configured to receive a game control signal; and a remote console server. The remote console server includes an audio and video encoder configured to receive an audio output and a video output from the game console and to convert the audio output and the video output to a network packet. The remote console server also includes: a game controller emulation unit and a network interface configured to send and receive the network packet. The game controller emulation unit is configured to receive a game controller signal from the game console and to send the game controller signal to the remote console client and to receive a game controller input from the remote console client and send the game controller input to the game console.

35 Claims, 13 Drawing Sheets

U.S. PATENT DOCUMENTS

| | | | |
|---|---|---|---|
| 2004/0109031 A1 | 6/2004 | Deaton et al. | 715/848 |
| 2004/0127272 A1 | 7/2004 | Park et al. | 463/6 |
| 2004/0266529 A1* | 12/2004 | Chatani | 463/40 |
| 2005/0021159 A1 | 1/2005 | Ogawa | 700/91 |
| 2005/0231469 A1 | 10/2005 | Wittig | 345/156 |
| 2007/0021213 A1* | 1/2007 | Foe et al. | 463/42 |
| 2008/0119290 A1* | 5/2008 | Lee et al. | 463/47 |
| 2008/0267069 A1* | 10/2008 | Thielman et al. | 370/235 |

OTHER PUBLICATIONS

Henders, Tristan, "Latency and User Behaviour on a Multiplayer Game Server", 2001, Springer-Verlag.*
Verizon Open Whole New Virtual World of Online Games, Sep. 13, 2005.
GameSpy—ARCADE for the Internet Subscription.
Steam Subscription Service, 2006 Valve Corporation.

* cited by examiner

SYSTEM FOR REMOTE GAME ACCESS

CROSS-REFERENCES TO RELATED APPLICATIONS

This application claims priority to U.S. Provisional Patent Application No. 60/806,233 filed Jun. 29, 2006 entitled "System for Remote Game Access", incorporated herein by reference.

BACKGROUND

Typical game consoles are designed to output audio and video signals to a display such as a television system. Users generally play console games by going physically to the console. A system that allows users to play console games from remote locations over a network would allow users to play a console games without physically going to the location of the game console.

SUMMARY OF THE INVENTION

Embodiments of the present invention enable users to play console games from remote locations in real-time, over a network. Embodiments also provide for a system to allow users to determine which game consoles are available and provide a system to manage the access and accounting for multiple users, thereby creating a virtual arcade.

Embodiments of the present invention bring the game console to the user as opposed to the current static configuration where the user must go to the console. Embodiments of the present invention are configured to allow remote access to various types of game consoles and are not limited to systems that are strictly designed for playing games. Game consoles include standard computers that are capable of performing many other functions in addition to allowing the user to play games. Embodiments comprise a remote console server (RCS), which further comprises a console virtualization engine (CVE). In certain embodiments, the RCS comprises an audio and video encoder that digitizes and compresses the audio and video output of a game console and sends them as TCP/IP network packets to a remote console client (RCC). The RCS may also comprise a game controller emulation (GME) unit that sends game controller signals from the console to the RCC and receives game controller input from the RCC and passes it to the game console. In addition, in certain embodiments the RCS may comprise a memory card emulation (MCE) unit that emulates the memory card of the game console.

The memory card of the game console is used to save user game configuration for games played on the console. By emulating this function, the RCS allows user game settings to be uploaded from the game console for storing in a repository. The emulation unit also allows user game setting information to be downloaded to the RCS so that it can be used by the game console. This allows a user to play games on any virtualized console, as the user's game configurations are enabled to migrate to different units. Thus, the RCS preserves the continuity of game playing experience for the user, enabling the impression of playing from the same game console unit.

DETAILED DESCRIPTION OF PREFERRED EMBODIMENTS

Figure 1:
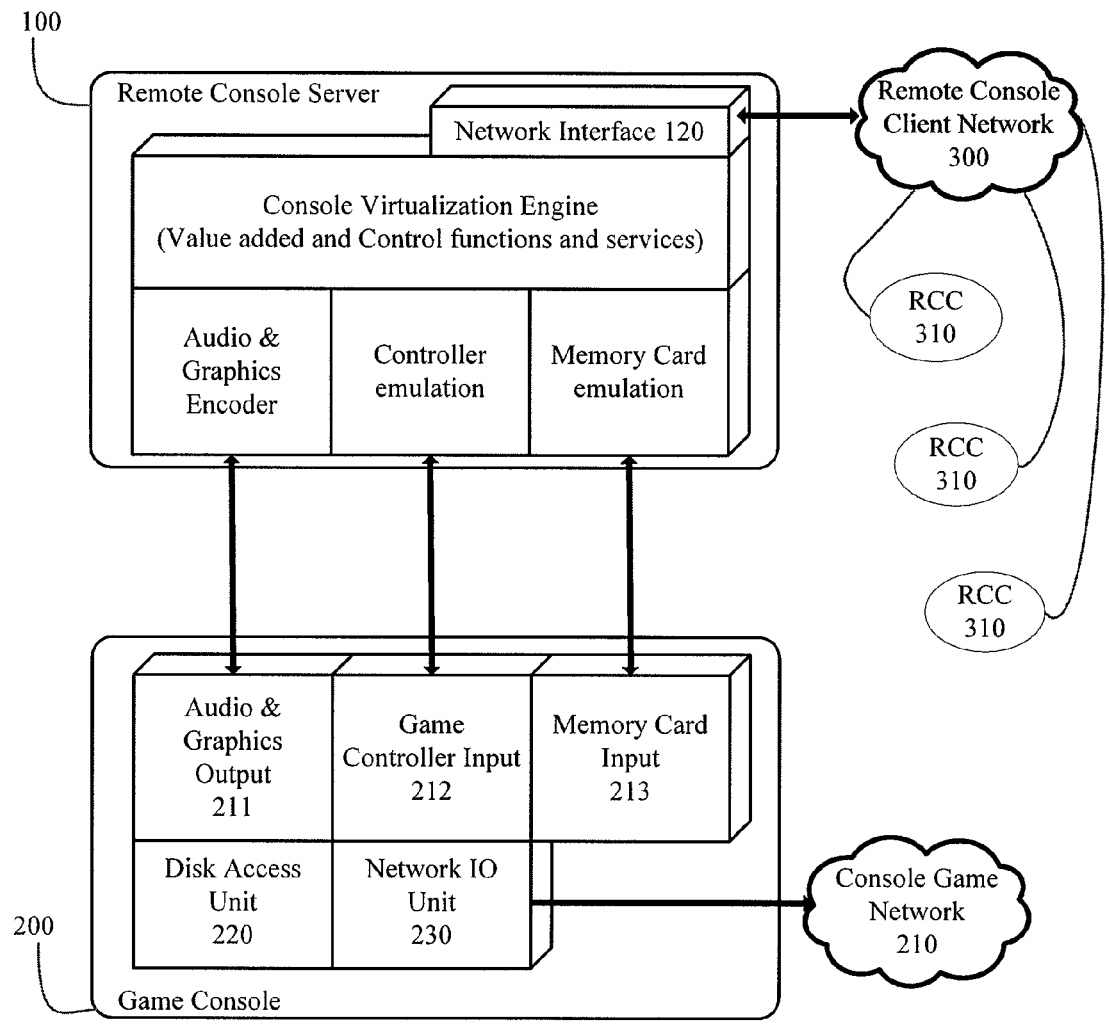
FIG. 1 is a schematic of a remote console server and a game console of one embodiment of the present invention.

Referring initially to FIGS. 1-4, an RCS 100 is configured to communicate with a game console 200 and a remote console client (RCC) network 300. The physical connection between the game console 200 and RCS 100 can be wired or wireless. RCS 100 further comprises a console virtualization engine (CVE) 110 and a network interface 120. CVE 110 further comprises an audio and graphics/video encoder 111, a controller emulation unit 112, and a memory card emulation unit 113. Game console 200 generates an audio and graphics output 211 and receives a game controller input 212 and a memory card input 213. Game console 200 further comprises a disk access unit 220 and a network 10 unit 230 for accessing a console game network 210. RCC network 300 comprises at least one individual RCC 310. In certain embodiments, the various components of the system are connected to the internet via a local area network (LAN) 411 and router 412.

RCC 310 regenerates the signals received from audio and graphics output 211. RCC 310 also accepts game control signals from the user through a game controller 311, a keyboard 312 or a mouse 313 connected to it. Through a controller translator 314, RCC 310 further encodes and transmits these game control signals in packet 315 (shown in FIG. 3) back to RCS 100 via virtual game play session manager (VGSM) 375. RCS 100 then converts packet 315 to controller input signals 317 in controller emulation unit 112 expected by game controller input 212 of game console 200. In certain embodiments, RCS 100 is configured to receive game controller signals from the game controller input 212 and send them to RCC 310. For example, some game controllers are configured to vibrate or illuminate based on game controller signals received from game controller input 212.

Figure 3:
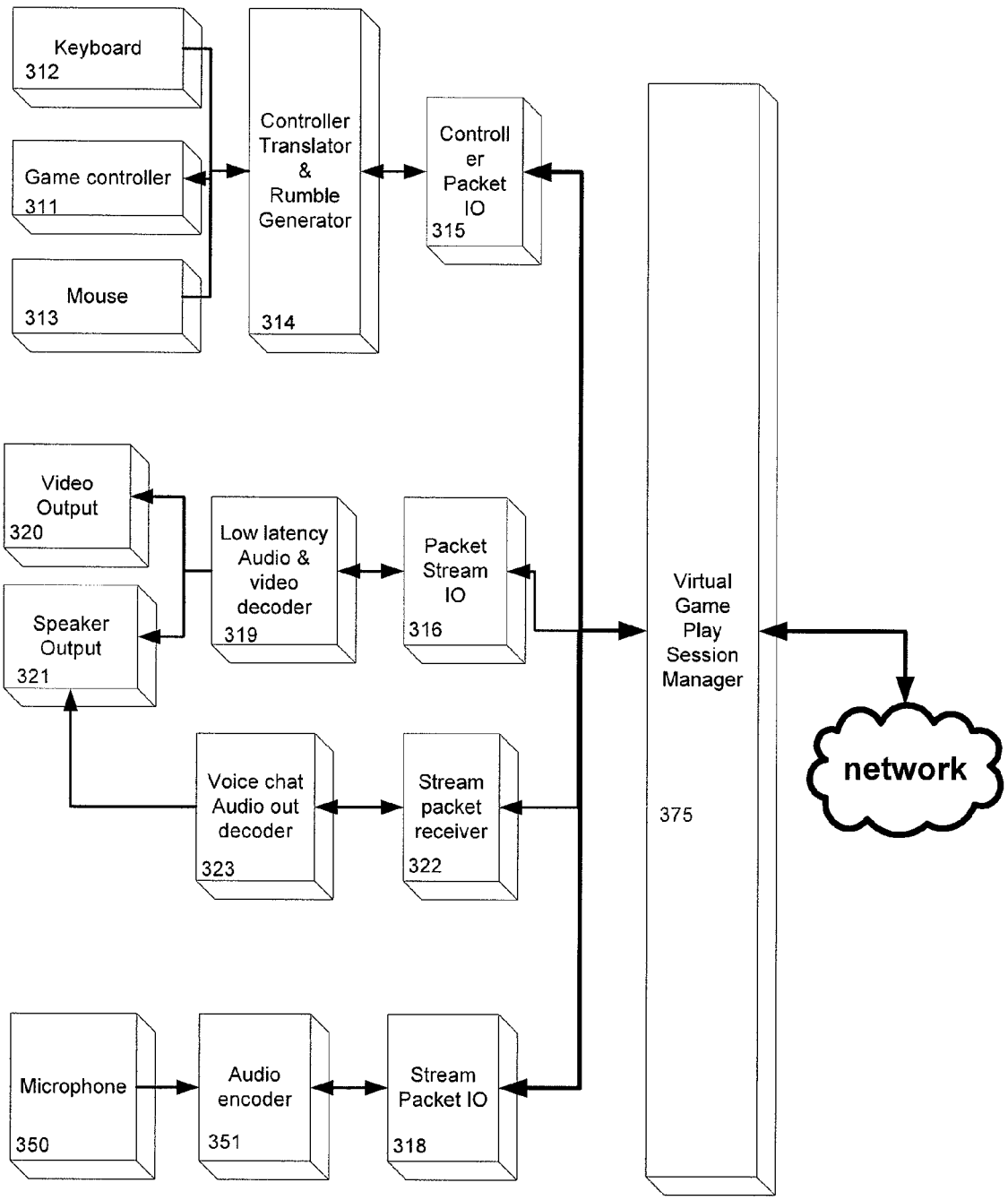
FIG. 3 is a schematic of subsystems used in a remote console client in one embodiment of the present invention.

In the embodiment shown in FIG. 3, RCC 310 also includes a microphone input 350 that passes through an audio encoder 351 and is converted to packet 318. Packet 318 is sent to RCC 310 units connected to RCS 100, thereby allowing users to have verbal interactions while playing or viewing a game on game console 200.

Audio and graphics output 211 of game console 200 is sent through the audio and graphics encoder 111 of RCS 100 to VGSM 375 of RCC 310. After VGSM converts output 211 to a packet 316, a low latency audio and video decoder 319 generates a video output 320 and an audio/speaker output 321. In certain embodiments, RCS 310 also comprises a stream packet receiver 322 that communicates with a voice chat/audio out decoder 323 that is sent to speaker output 321. Stream packet receiver 322 and voice chat/audio out decoder 323 allow multiple users to verbally communicate with one another while playing a game.

In certain embodiments, the RCS may adapt the video quality and latency to the available bandwidth by changing encoding parameters to improve users' real-time experience. The video quality and latency may be adjusted by the user or, alternatively, may be adjusted automatically by the system. Further, the RCS may adapt the video quality and latency depending on the type of images being sent to the RCC. For example, in Text Mode, the RCS can send images at slow frame rates but high resolutions. This mode may be useful when the user needs to read game text during game setup or game play. In another embodiment, the Text mode encoding may be implemented as a background process and the data may be transmitted as a sub-channel to the primary game stream. RCC users can dynamically switch between real-time interactive game stream and Text Mode views as necessary. Certain embodiments may also comprise a TV Mode, in which the RCS can send video images using higher compression, higher latency and higher quality video transmission.

In certain embodiments, RCS 100 possesses some or all of the following capabilities:

1. Identifying game controllers plugged into the user's RCC, automatically querying, and retrieving compatible controller configuration from a global server when the user initiates game play;
2. Caching controller configurations for future use;
3. Automatically loading game help information, such as the function of game pad controls in a game;
4. Adjusting to different game console controller types and game save memory emulation system; and
5. Downloading new modes as new console platforms or updates to console platforms become available.

In certain embodiments, RCC 310 possesses some or all of the following capabilities:

1. Sufficient computing power to decode and regenerate audio and video streams from RCS 100 in real-time;
2. TCP/IP network connectivity with sufficient bandwidth to accept the packet stream from RCS 100; and
3. An I/O interface to accept a controller adapter that allows a game controller 311 to be connected or other I/O capabilities that are capable of generating signals that can be interpreted as game controller functions.
4. A microphone interface to allow the user to connect microphone 350 to RCC 310.

Figure 2:
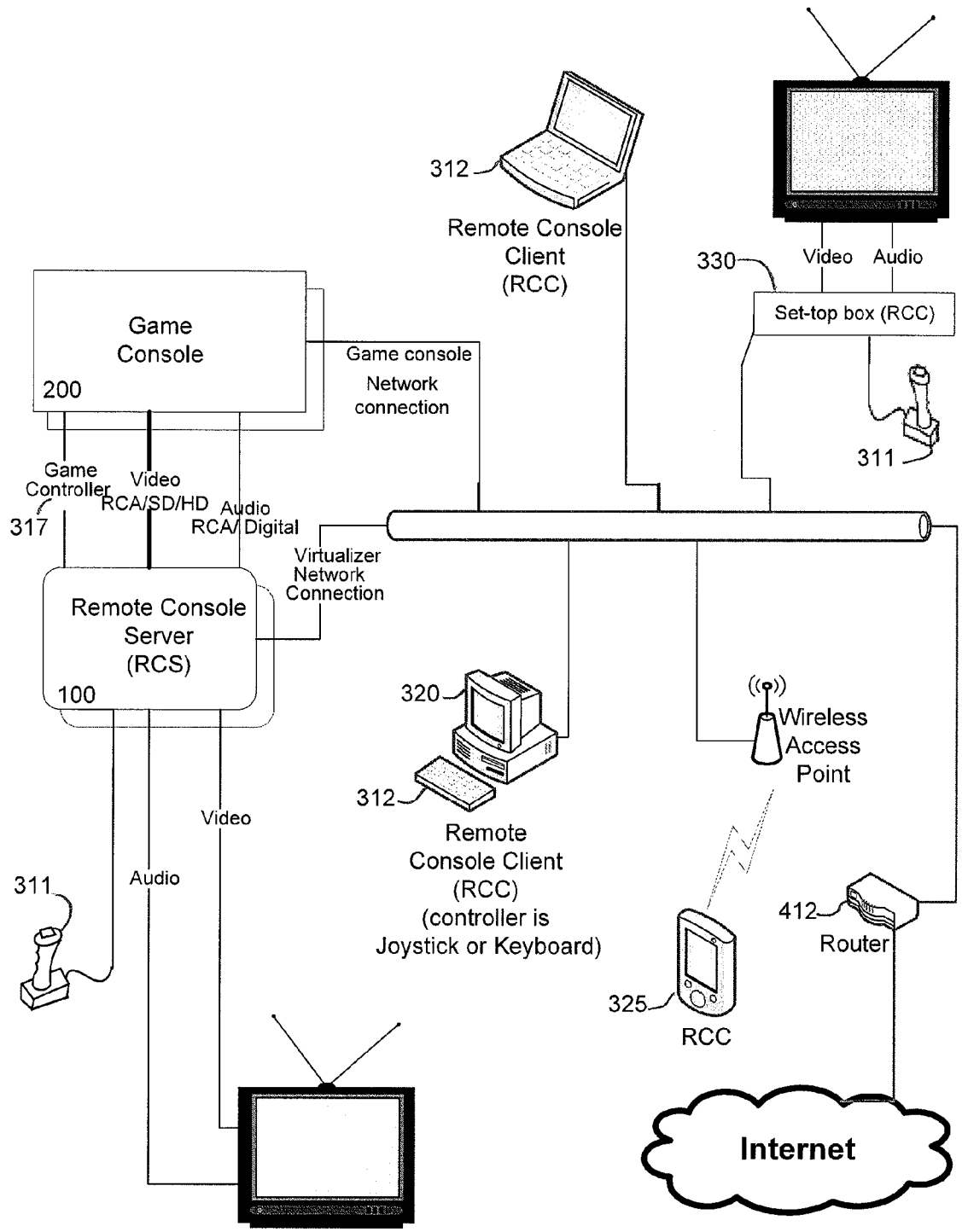
FIG. 2 is a schematic of a system in one embodiment of the present invention.

There are a wide range of devices that are known to meet these criteria. As shown in FIG. 2 for example, RCC 310 may comprise a desktop computer 315, a laptop (mobile) computer 320, a hand-held device such as a personal digital assistant (PDA) 325, or a television set top box 330. Embodiments of this disclosure are compatible with each of these platforms as well as other similar devices.

Multi-Player Capability

Software running on RCS 100 enables multiple players to share game console 200, such as is currently available in multi-controller, multiplayer games. Each RCS 100 announces its presence to other RCS 100 systems on the local network. Users may then initiate connections to available RCS 100 systems.

Each RCC 310 may be logically connected to at least one input device such as game controller 311, keyboard 312 or mouse 313. Controller inputs from each RCC 310 are forwarded to the designated input on RCS 100. An RCC 310 that can control a port on game console 200 is called "active". Additionally, RCS 100 may allow more users than the game allows as players to connect in passive or monitor-only sessions. These passive RCCs 310 receive signals from audio and graphics output 211 but no controller input is passed back to RCS 100. Both active and passive users may also communicate verbally through their RCCs. Thus, many users can view a game remotely and virtually experience the feeling of being in the same room. RCS 100 enables an active RCC 310 to hand over control of its controller to a passive RCC 310, thereby making the passive RCC 310 active and causing the active RCC 310 to become passive.

Desired Characteristics

Certain physical network criteria, such as sufficient downstream network bandwidth, are beneficial for providing an optimal remote gaming experience for users. Downstream bandwidth is the network bandwidth needed to send packets from RCS 100 to the RCC network 300. Depending on the RCC unit 310 characteristics (display size, resolution and desired audio quality), bandwidths of between 256 Kb/sec (portable) and 8 Mb/sec (high definition) are needed per user. This is within the capacity of wired and wireless local area networks, such as is typically available in a home or commercial environment. Smaller portable devices generally require less bandwidth because of the smaller display. A wireless network, for example as may exist at a hotspot can sustain many remote play sessions concurrently depending on the network and the specific device characteristics. A 54 Mb/sec wireless network at 50% efficiency could support 50 concurrent remote play users at 384 Kb/sec each. Similarly, the downstream bandwidth of broadband connections (Cable/DSL/Wireless) of 384 Kb/sec and greater is able to support at least one remote play user. RCS 100 is designed to support network bandwidth of 100 Mb/sec and higher and is therefore able to host many users.

Sufficient upstream bandwidth is also desirable to provide an optimal remote gaming experience for users. Upstream bandwidth is the bandwidth needed to transmit controller commands from RCC network 300 to RCS 100. A bandwidth of 2 Kb/sec is typically needed for this function. Additionally, voice grade audio for voice sharing typically needs about 8 Kb/sec. Thus, a total of 10 Kb/sec is generally needed per user. This is within the upstream bandwidth of typical broadband networks which generally have upstream bandwidths of 64 Kb/sec and higher. Local area wired/Wi-Fi networks typically have symmetric bandwidth.

Low network latency is also desirable to provide an optimal remote gaming experience for users. To maintain the experience that users obtain from direct play of console games, the time for packets to travel from RCS 100 to RCC 310 (latency) should be low, of the order of less than 20 milliseconds (ms). On a local area network, latencies are generally significantly lower (<2 ms). Network latencies across the Internet and wide area networks (WAN), however can vary much more significantly. This is generally so when greater geographic distances exist between the communicating parties. Embodiments of the present disclosure will enable an RCC 310 to automatically locate a RCS 100 that is hosting user-desired games that are "closest" to them (lowest latency) and thereby help ensure an optimal game experience.

Video and audio encode/decode latency is also desirable to provide an optimal remote gaming experience for users.

Embodiments of the present disclosure provide RCS 100 to RCC 310 encode-decode latencies of less than 100 ms. This is within the bounds that will ensure user perception of direct play experience.

Global Servers

In certain embodiments, remote console play may benefit from the following features;

1. Users may need a unified way of locating RCS 100 and games on the network.
2. Upon locating RCS 100, a method for reserving it for exclusive use may be needed until the session is terminated.
3. An accounting method that allows for the user to access the device without requiring local re-authentication and conducts appropriate time tracking and billing.

Figure 4:
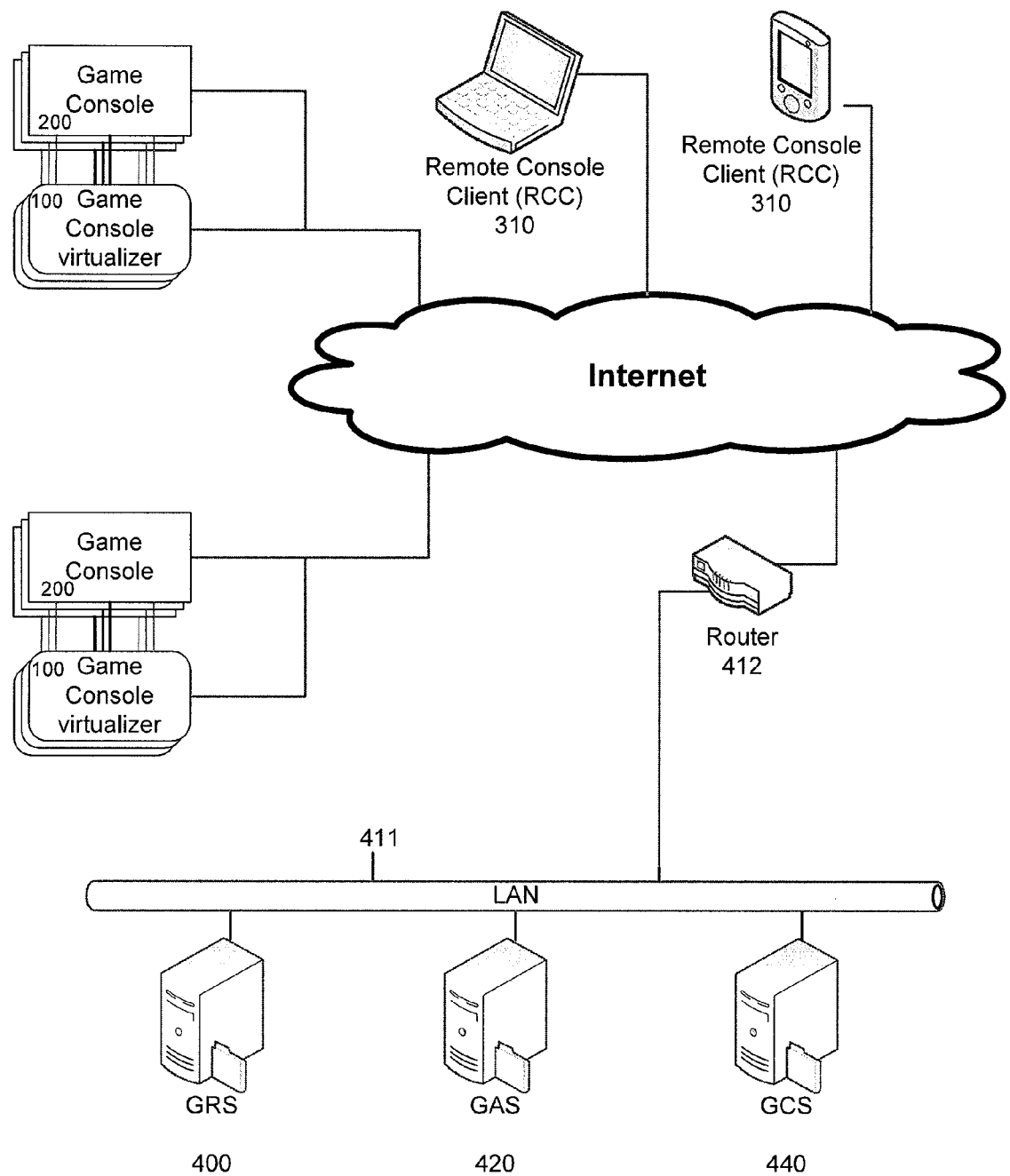
FIG. 4 is a schematic of a system in one embodiment of the present invention.

Referring now to FIG. 4, embodiments of the present disclosure comprise one or more global servers that provide these functions, enabling the distributed network of RCS 100 to be easily accessed by users and providers. The servers can be owned by a central company that charges a percentage of the fee billed to RCC 310 users who pay to access RCS 100. The central company may also profit from advertisements displayed on RCC 310.

In certain embodiments, the following 3 servers can be used to enable this service to users:

1. Global Registry Server (GRS) 400: For enabling easy discovery of available RCS 100 and games hosted by them.
2. Global Configuration Server (GCS) 420: For persistent storage of user game settings.
3. Global Authentication Server (GAS) 440: For authenticating access to RCS 100 from RCC 310.

GRS 400, GCS 420 and GAS 440 are connected to the internet via a local area network (LAN) 411 and router 412. Software on RCS 100 and RCC 310, with user input, communicates with these servers 400, 420 and 440 to ensure a user-friendly experience accessing remote play network devices and services. While GRS 400, GCS 420 and GAS 440 serve different functions within the system, in certain embodiments, all functions could be performed by one physical global server.

Global Registry Server (GRS)

In certain embodiments, each game console 200 is allowed to play a single game at an instant in time. GRS 400 will allow users to register their RCS 100 and track/monitor its availability. When RCS 100 becomes busy because a game is being played on game console 200, RCS 100 reports this to GRS 400. Similarly, RCS 100 may regularly register with the FRS 400 and report when it becomes available. RCC 310 users search GRS 400 to locate and reserve access to game consoles 200 that are accessible to them. RCS 100 owners register their servers and the games available with GRS 400 and specify who is allowed to access it. Access is defined in the context of a play cell community, subsequently described in more detail below.

Global Configuration Server (GCS)

In certain embodiments, the GCS 440 is a persistent store server that allows users to save and restore their game configuration from GCS 440 to game console 200 via attached RCS 100. When a user connects to RCS 100 to play a game, the option to download a previous game configuration is provided. Thus, as users play a given game on different physical RCC 310 units or RCS 100 units, the perception of continuity in game play is enabled.

Global Authentication Server (GAS)

In certain embodiments, GAS 420 creates and authenticates user accounts. RCC 310 users create accounts by registering on GAS 420. This allows time auditing and authentication to be done for the use of RCS 100 to play games. If a specific RCS 100 used is enabled for billing, the RCC 310 user's account may be charged and the RCS 100 owner's account may be credited. This single system view enables RCC 310 users to locate and use any available RCS 100 and authenticate only once for signing onto the service. The account creation process involves users requesting membership in play cells. An RCS 100 owner creates a play cell for the RCS 100 registered on GRS 400. RCS 100 owners can open access to their RCS 100 to other RCC 310 consumers by adding them to their play cell Community. RCC 310 users can also request access to community by contacting the owner of that play cell community.

In certain embodiments, franchise RCS 100 systems are enabled to communicate with GRS 400, GAS 420 and GCS 440 to participate in creating a single directory view of the registration, configuration and account management to users.

Play Cell Network

Figure 5:
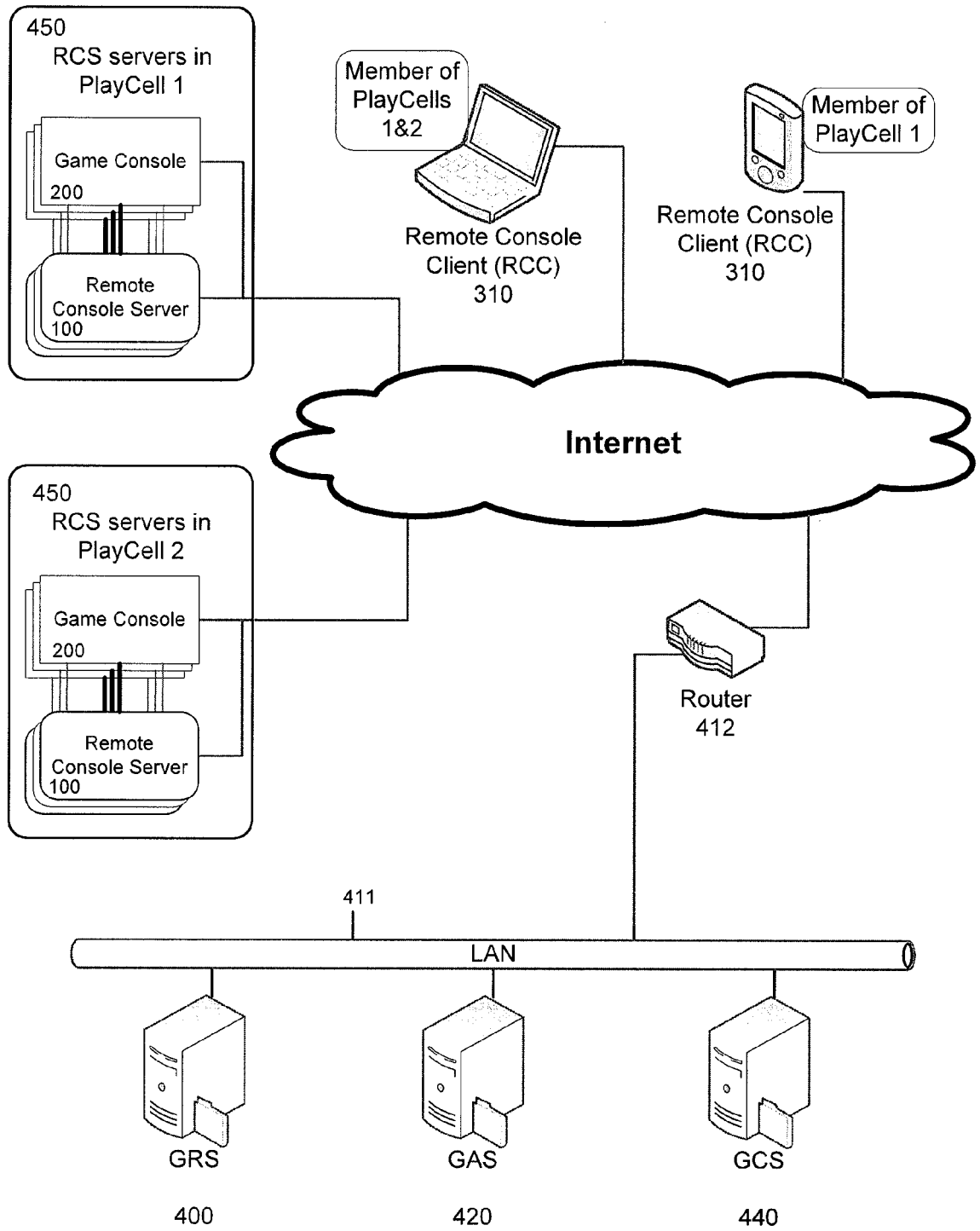
FIG. 5 is a schematic of a system in one embodiment of the present invention.

Referring now to FIG. 5, through its global servers (GRS 400, GAS 420 and GCS 440) and RCC 310 software, certain embodiments of this disclosure enable the creation of a shared community or network called a play cell 450. Play cell 450 is one or more RCS 100 that only members in that specific play cell 450 can access from their RCC 310. One method for creating play cell 450 comprises the following steps:

1. User creates an account on GAS 420.
2. User registers RCS 100 with GRS 400. This creates play cell 450 with a membership of 1, which is the owner of RCS 100. The owner of RCS 100 has management privileges over who joins/leaves his/her play cell 450. If the user already owns an existing play cell 450, GRS 400 can add RCS 100 to the existing play cell 450, as opposed to creating a new one. In certain embodiments intended for individual users, each RCS 100 is designed to support a relatively small number (for example, two) of game consoles 200 concurrently. In other embodiments intended for commercial or franchise use, RCS 100 may support a greater number (for example, ten or more) of game consoles 200.
3. The owner of play cell 450 invites others to use their RCS-enabled consoles 200 by:
   i. Adding the names of the user accounts or cells that can access his/her server's play cell 450.
   ii. Opening the play cell 450 to general use.

In certain embodiments, the RCC 310 has built in instant messaging type functions that enable users to:

1. Monitor the status of RCS 100 to determine its availability and to request access to RCS 100.
2. Notify the user when an RCS 100 become available.
3. Chat with users in their play community.
4. Coordinate the playing of multiplayer games.
5. Manage their contact list and server watch list.

In certain embodiments, users may have access to real-time multimedia streams of live game play through a global web portal system. Game console owners can also expose and manage remote access to their game consoles via this web portal.

Franchise Remote Console Server Systems

Certain embodiments enable businesses to deliver game-on-demand services for console games on their local network or via WAN. The system technology is designed for:

1. Serving a large number of consoles (for example, greater than 10);
2. User authentication and accounting; and
3. System administration and management.

These embodiments enable the creation of game-on-demand services (virtual arcades) in malls, shopping centers, hotels, Wi-Fi hot spots, etc. FIG. 5 depicts this system. Multiple RCS units can be managed and franchised as a common pool through a web portal.

In certain embodiments, messages such as advertisements can be sent to RCC 310 from either RCS 100 or from global servers. Further, users' usage patterns of games played or viewed through either a web portal or franchise location can be collected and used to target advertisements to users.

Figure 6:
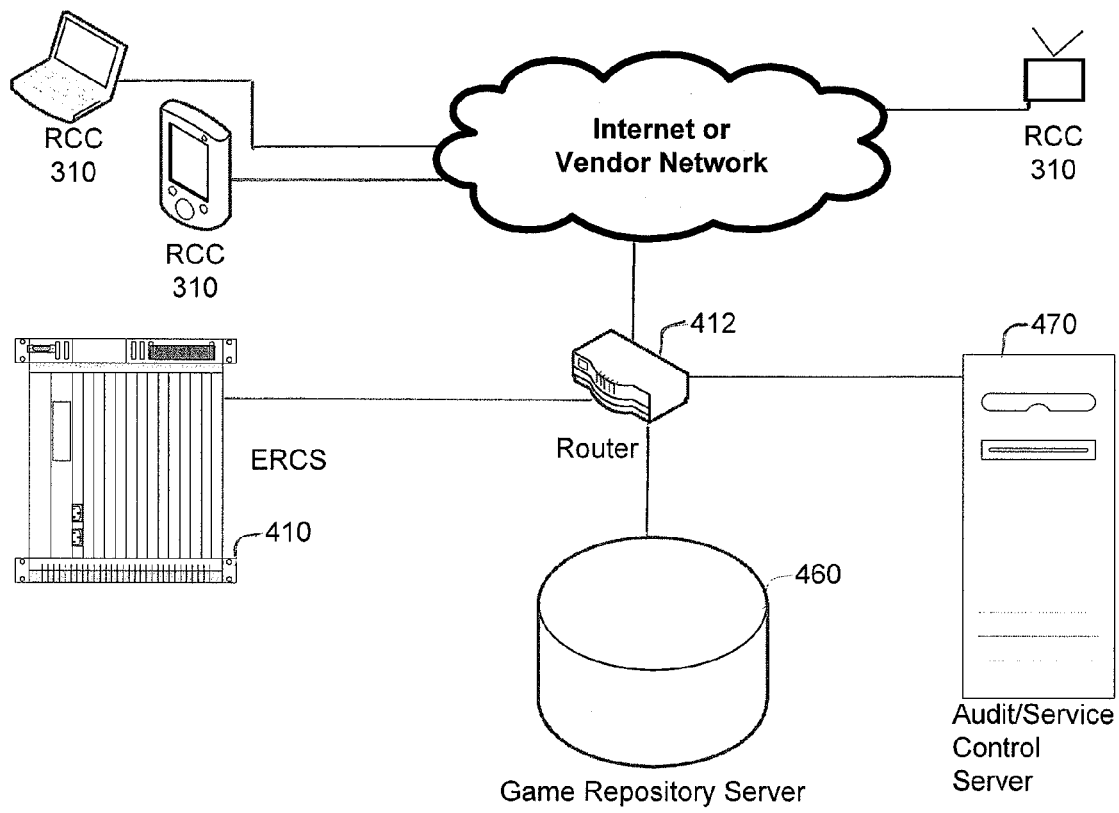
FIG. 6 is a schematic of a system in one embodiment of the present invention.
Figure 7:
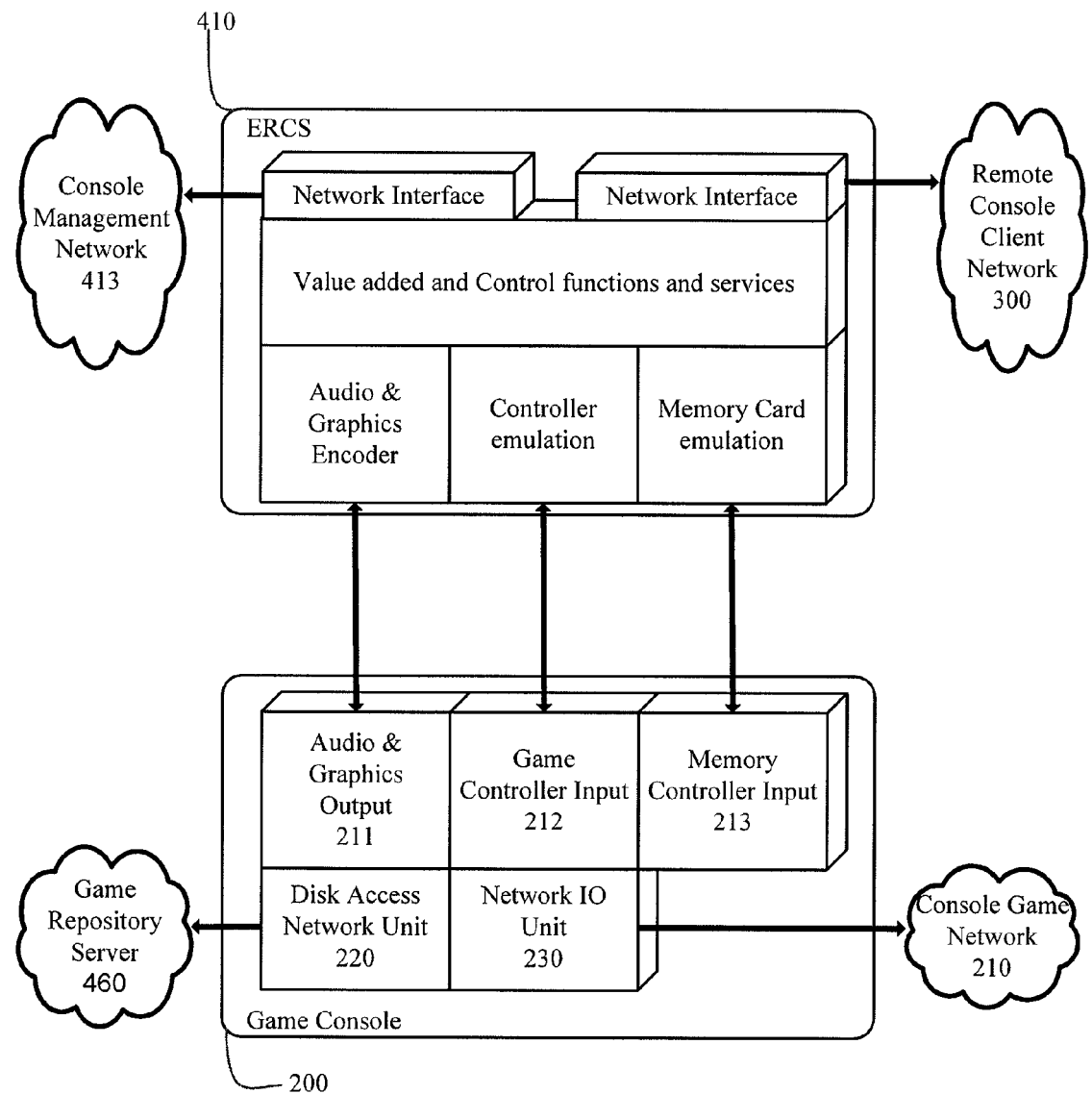
FIG. 7 is a schematic of a system in one embodiment of the present invention.

Referring now to FIGS. 6 and 7, certain embodiments of the present disclosure include highly scalable Enterprise Remote Console Servers (ERCS) 410 and distribution rights from game manufacturers that will enable businesses to provide on-demand game services. ERCS 410 comprises the ability to load games on-demand to the console from a Game Repository Server (GRS) 460 as opposed to a local disk unit. ERCS 410 also interfaces with a console management network 410 to link up to other remote console servers. An audit/service control server 470 controls the access to the on-demand games and provides record-keeping functions. Other embodiments also comprise a disk changer for game console 200. The disk changer is under the control of RCS 100 and enables the user to do remote selection of games from the library available in the disk changer.

Figure 8:
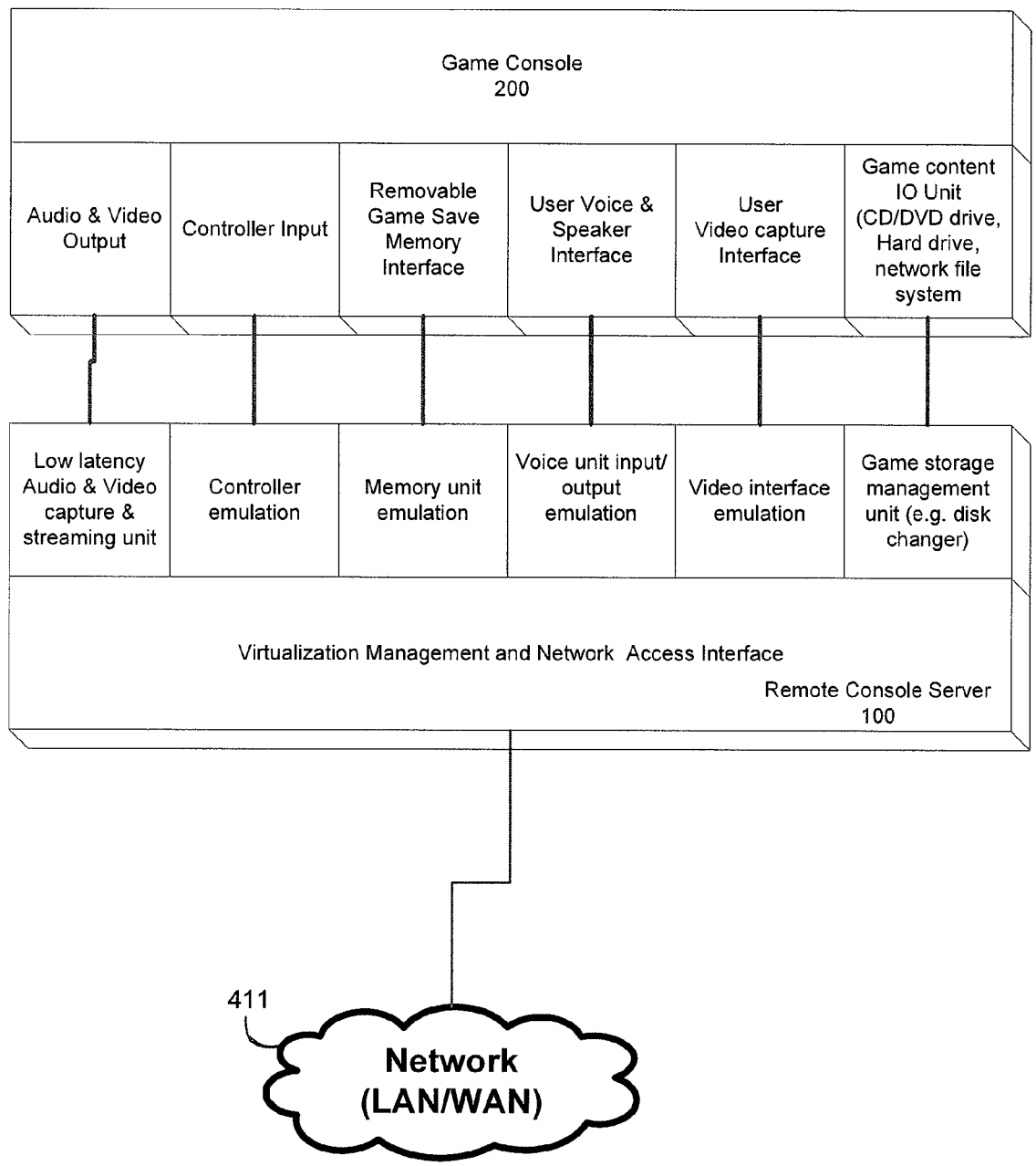
FIG. 8 is a schematic of a remote console server and a game console of one embodiment of the present invention.

Referring now to FIG. 8, an overview and summary of the interaction between game console 200 and remote console server 100 is shown for one embodiment. The individual functions shown in FIG. 8 are described above in the discussion of the various embodiments.

Figure 9A:
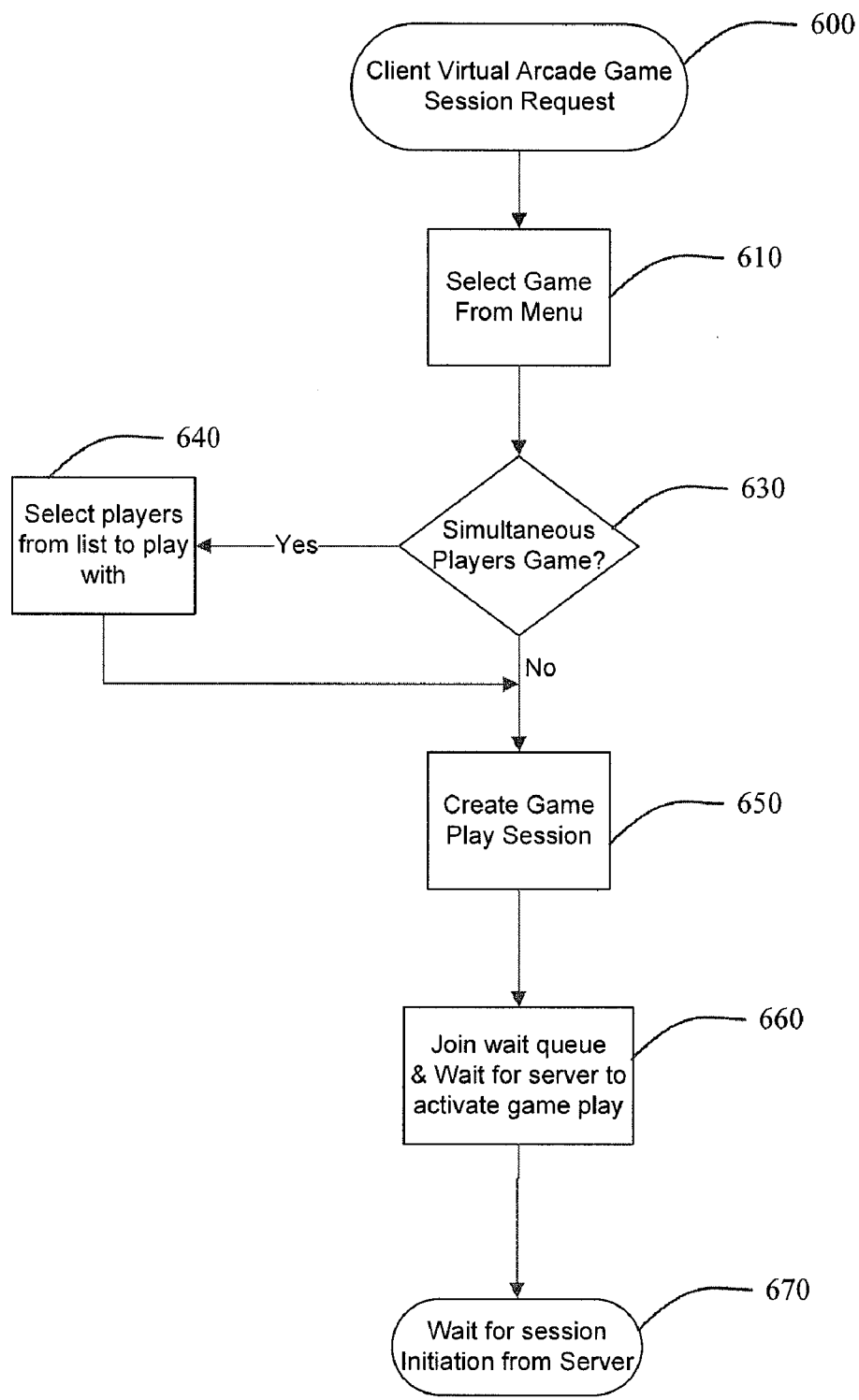
FIG. 9A is a logic flowchart for a virtual arcade session request in one embodiment of the present invention.
Figure 9B:
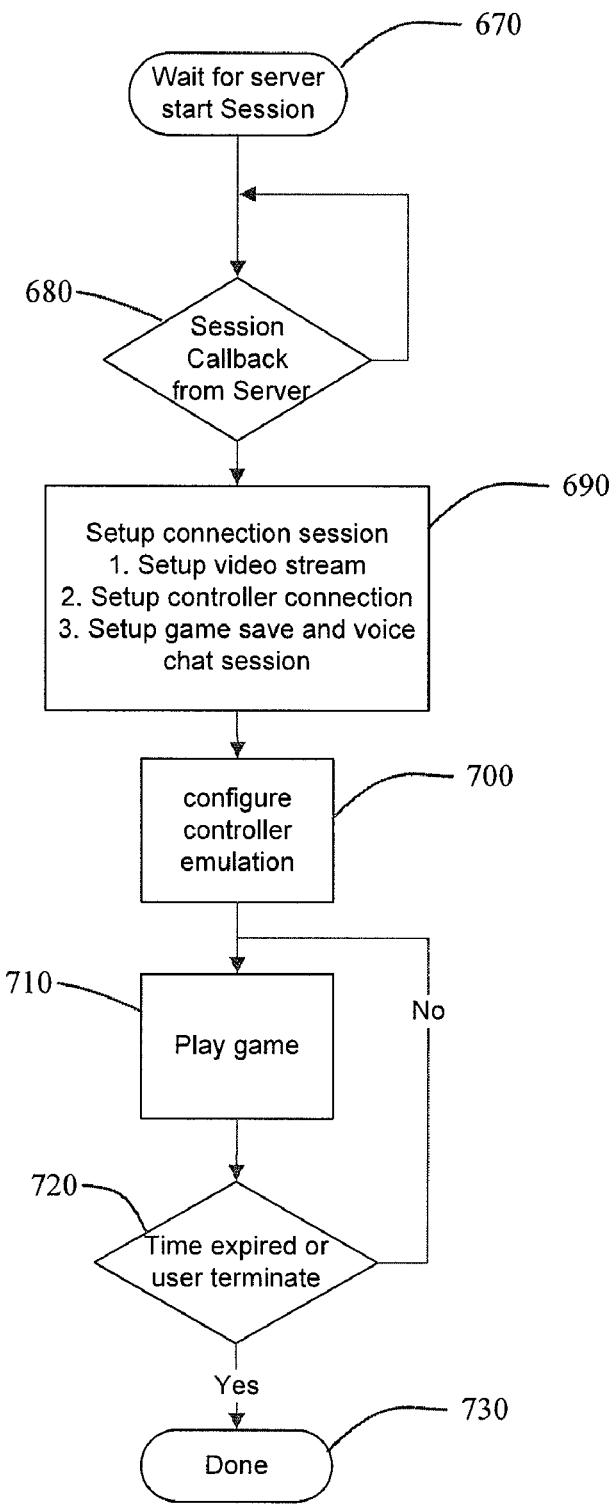
FIG. 9B is a logic flowchart for a virtual arcade session request in one embodiment of the present invention.

Referring now to FIGS. 9A and 9B, a logic flowchart of the initiation sequence used in certain embodiments is shown. As illustrated, a session request 600 allows a user to enter a game selection 610. A query 630 then evaluates whether game selection 610 is a simultaneous players game. If so, a player selection 640 is performed before a game play session 650 is created. After game play session 650 is created, the user joins a wait queue 660 and waits for a session initiation 670 via a session callback 680. After session initiation 670, a setup connection session 690 is created and the controller emulation 700 is configured. The user then plays game 710 until an expiration or termination signal 720 is generated, at which time the game completion 730 is accomplished.

Figure 10:
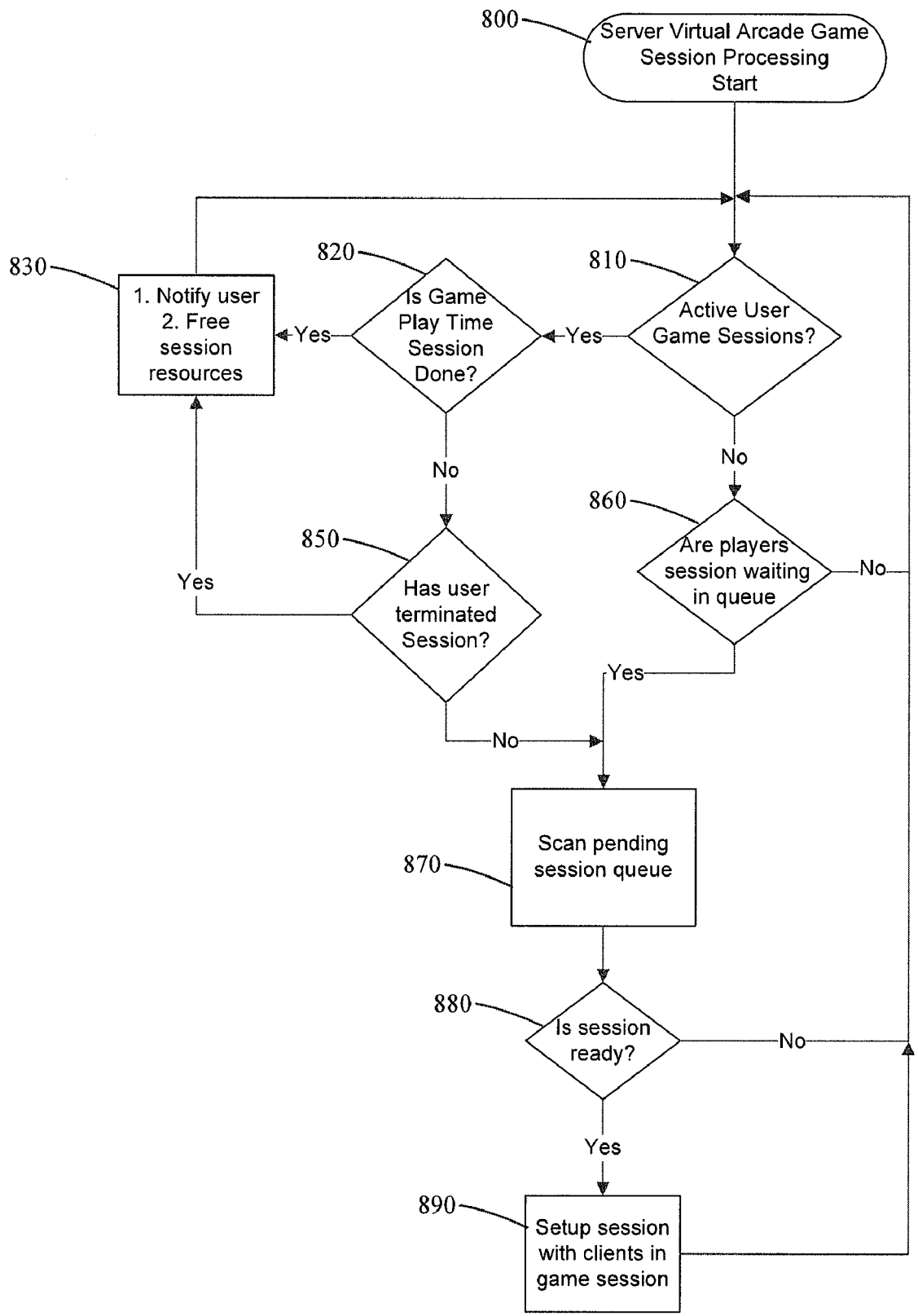
FIG. 10 is a logic flowchart for a server virtual arcade game session processing start in one embodiment of the present invention.

Referring now to FIG. 10, a logic flowchart for the session processing used in certain embodiments is shown. As illustrated, an initiation 800 of session processing leads to a query 810 of active game users. If there are no active game users, a query 860 is performed to determine if players are waiting in queue. If there are active game users, a query 820 determines if the game play time has expired. If play time has expired, a notification 830 is sent to the users and session resources are freed. If play time has not expired, a query 840 is performed to determine if the user has terminated the session. If the user has not terminated the session and there are players waiting in queue, a scan 870 is performed of the pending session queue. After scan 870, a query 880 is performed to determine if the session is ready. If the session is ready, the session 890 is then initiated.

Figure 11:
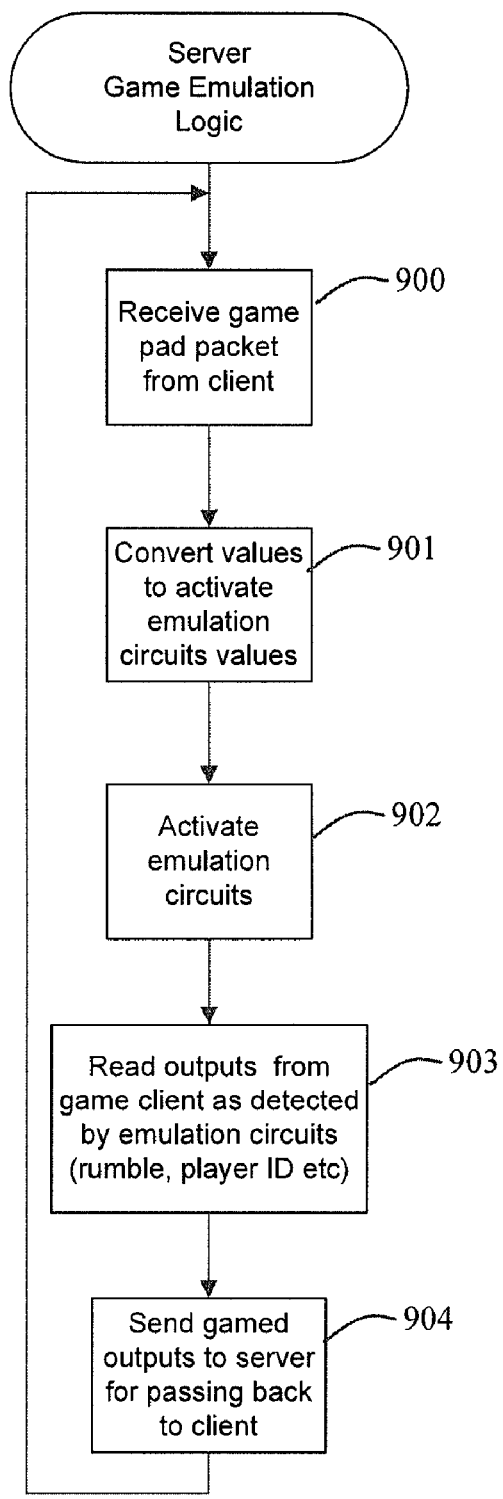
FIG. 11 is a flowchart for server game emulation logic in one embodiment of the present invention.

Referring now to FIG. 11, a logic flowchart for server game emulation logic used in certain embodiments is shown. After a receipt 900 of a game pad packet from a user, a conversion 901 is performed on the game pad packet values. After conversion 901, an activation 902 of the emulation circuits and a reading 903 of outputs from the game client is performed. Finally, a sending 904 of game outputs to the server is conducted for relaying to the user.

Figure 12:
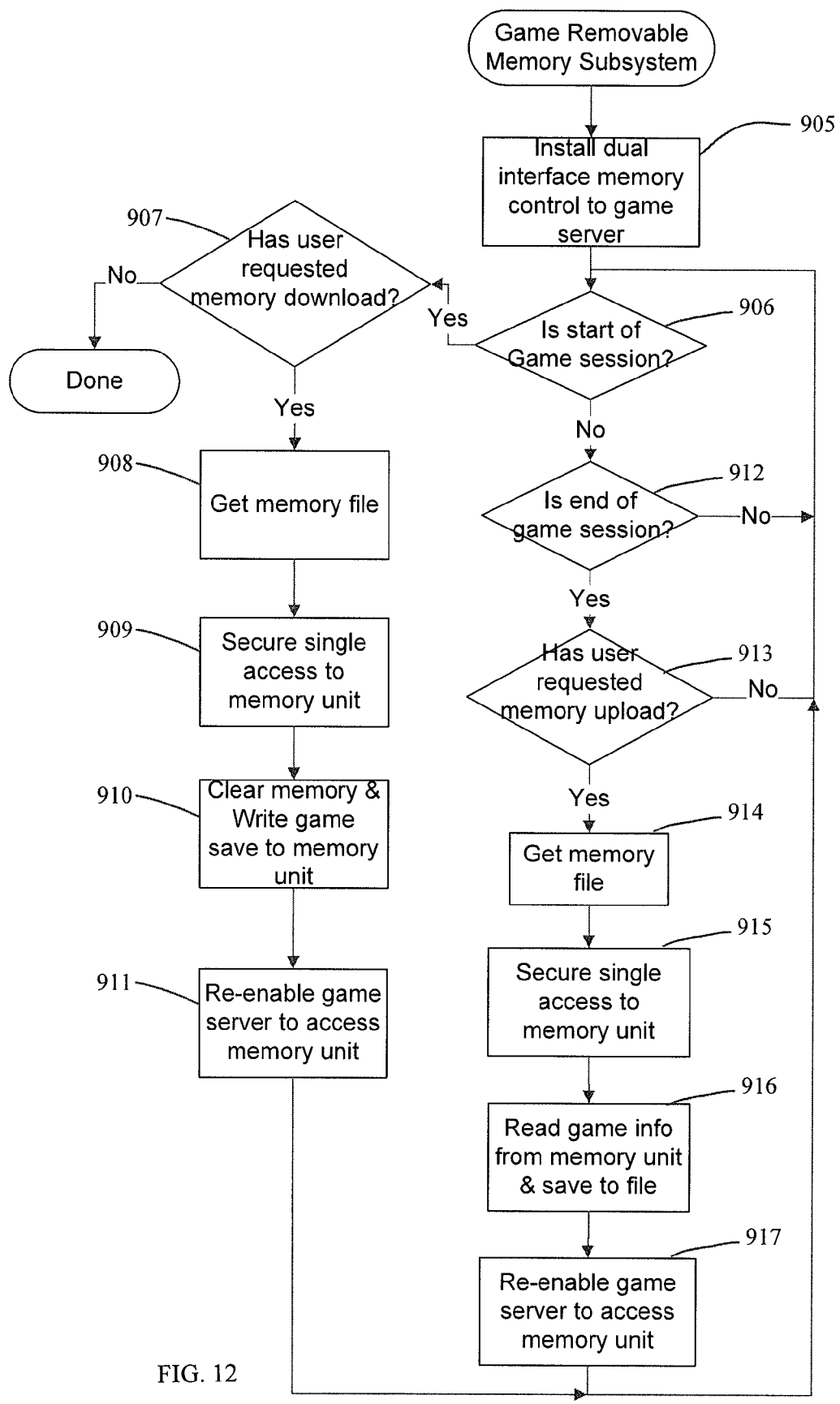
FIG. 12 is a logic flowchart for game removable memory subsystem in one embodiment of the present invention.

Referring to FIG. 12, a logic flowchart for a game removable memory subsystem used in certain embodiments is shown. After installation 905 of a dual interface memory control to the server, a query 906 determines if the game session is starting. If the game session is starting, a query 907 determines if the user has requested a memory download. If so, an acquisition 908 of the memory file is conducted followed by securing single access 909 to the memory unit. This is followed by a clearing 910 of memory and a re-enablement 911 of the game server to access the memory unit. In certain embodiments, the memory transfer between the RCC 310 and the global servers can be accomplished automatically.

If the game session is not starting, a query 912 is performed to determine if the game session is ending. If so, another query 913 determines whether the user has requested a memory upload. If the user has requested a memory upload, an acquisition 914 of the memory file is conducted, followed by a securement 915 of single access to the memory unit. This is in turn followed by a reading 916 of game info from the memory unit and a re-enablement 917 of the game server to access the memory unit.

With the benefit of the present disclosure, those having ordinary skill in the art will comprehend that the embodiments described herein may be modified and applied to a number of additional, different applications, achieving the same or a similar result.

The invention claimed is:

1. A system for allowing a user to remotely access a game, the system comprising:
   a game console, the game console being one of a plurality of various types of game consoles, the game console further having a game controller port, an audio output, and a video output; and
   a remote console server comprising:
      a console virtualization engine configured to allow access to the game console to be managed through the remote console server, to allow a remote console client to communicate with various types of game consoles, and to allow the game console to receive game control signals from a plurality of different types of devices, the console virtualization engine comprising:
         an audio and video encoder configured to:
            receive the audio output and the video output from the game console; and
            convert the audio output and the video output to a network packet to be sent to the remote console client;
         a game controller emulation unit configured to:
            receive a game control signal from the remote console client through a network packet;
            convert the game control signal to a controller input signal expected by the game controller port for the game console; and
            send the controller input signal to the game controller port for the game console; and
      a network interface coupled to the console virtualization engine, the network interface being configured to send network packets to the remote console client and to receive network packets from the remote console client.

2. The system of claim 1, wherein the remote console server further comprises a memory card emulation unit configured to emulate a memory card for the game console, the remote console server being further configured to store a game configuration from the game console using the memory card emulation unit and to restore a game configuration to the game console using the game emulation unit.

3. The system of claim 1, wherein the remote console server is further configured to communicate with a global server.

4. The system of claim 3, wherein:
the global server is configured to save a game configuration from a remote console server and to restore a game configuration to a remote console server; and
the remote console server is configured to restore a game configuration to the game console through a memory card emulation unit, the memory card emulation unit being configured to emulate a memory card for the game console.

5. The system of claim 3, wherein the global server is configured to allow an owner of a game console to expose and manage remote access to the game console through the remote console server.

6. The system of claim 3, wherein the remote console server is configured to announce its presence by registering with other remote console servers or with the global server.

7. The system of claim 3, wherein the global server is configured to keep track of a usage of remote console servers by a remote console client.

8. The system of claim 7, wherein the global server is configured to bill a user or an owner of a remote console server.

9. The system of claim 1, wherein the remote console client is configured to display a message in addition to the video output from the game console.

10. The system of claim 9, wherein the message is an advertisement targeted to a user based on a usage pattern of a set of games played or viewed.

11. The system of claim 1, further comprising a global web portal system, wherein the user may access a plurality of real-time multimedia streams of live game play through the global web portal system.

12. The system of claim 1, further comprising a group of additional remote console servers, wherein each remote console server is configured to send a network packet that announces a presence of the remote console server and the remote console client is configured to locate the remote console server having a lowest latency with respect to the remote console client.

13. The system of claim 1 further comprising a portal that enables franchising of a set of remote console servers owned by the user, wherein the portal enables management of the set of remote console servers as a common pool.

14. The system of claim 1, wherein the remote console server is configured to digitize an analog signal from the game console.

15. The system of claim 1, wherein the remote console server is configured to automatically adjust a quality and a latency of a transmitted video depending on an available bandwidth or a type of image being transmitted.

16. The system of claim 1 wherein the remote console server is configured to automatically load game help information.

17. The system of claim 1 wherein the remote console server is configured for a plurality of audio-video encoding configurations wherein an image resolution, a frame rate, a compression rate, and a latency rate can be adjusted.

18. The system of claim 1 wherein the remote console server incorporates a plurality of game console controllers and game save memory emulation systems.

19. A remote console server for providing remote access to a game console comprising:
an audio input unit configured to receive audio signals from a game console;
a video input unit configured to receive video signals from the game console;
a console virtualization engine configured to allow access to a game console to be managed, to allow a remote console client to communicate with various types of game consoles, and to allow a game console to receive game control signals from a plurality of different types of devices, the console virtualization engine comprising:
an audio and video encoder configured to convert the audio and video signals to network packets to be sent to a remote console client;
a game controller emulation unit configured to:
receive a game control signal from the remote console client through a network packet;
convert the game control signal to a controller input signal expected by a game controller port for the game console; and
send the controller input signal to the game controller port for the game console; and
a network interface coupled to the console virtualization engine, the network interface being configured to send network packets to a remote console client and to receive network packets from a remote console client.

20. The remote console server of claim 19, further comprising a memory card emulation unit configured to emulate a memory card for a game console, wherein a game configuration from the game console can be stored using the memory card emulation unit and wherein a game configuration can be restored to the game console using the memory card emulation unit.

21. A method for allowing a user to remotely access a game, comprising:
providing a remote console server including a console virtualization engine configured to allow access to a game console to be managed through the remote console server, to allow a remote console client to communicate with various types of game consoles, and to allow a game console to receive game control signals from a plurality of different types of devices;
receiving with the remote console server an audio output and a video output from a game console;
using the console virtualization engine to convert the audio output and the video output to network packets;
sending the network packets with the audio output and video output from the remote console server to a remote console client via a network interface;
receiving with the remote console server a game control signal in a network packet from the remote console client via the network interface;
using a game controller emulation unit within the console virtualization engine to convert the game control signal to a controller input signal expected by a game controller port for the game console; and
sending the controller input signal to the game controller port for the game console.

22. The method of claim 21, further comprising storing a game configuration from the game console using a memory card emulation unit within the remote console server and restoring a game configuration to the game console using the memory card emulation unit.

23. The method of claim 21, further comprising saving a game configuration from a remote console server to a global server and restoring a game configuration to a remote console server from a global server.

24. The method of claim 21, further comprising communicating from the remote console server to a global server to expose the remote console server and to manage remote access to the remote console server.

25. The method of claim 21, further comprising using the console virtualization engine to communicate with multiple game controller ports for the game console to allow multi-controller multiplayer game play on the game console.

26. The method of claim 21, wherein further comprising providing audio output and video output from a game console through the remote console server to more remote console clients than a number of players allowed by a game running on the game console.

27. The system of claim 1, wherein the game controller emulation unit is further configured to receive a game controller signal from the game console and to send the game controller signal to the remote console client through a network packet.

28. The remote console server of claim 19, wherein the game controller emulation unit is further configured to receive a game controller signal from the game console and to send the game controller signal to the remote console client through a network packet.

29. The method of claim 21, further comprising receiving a game controller signal from the game console and sending the game controller signal to the remote console client via the network interface.

30. The system of claim 3, wherein the global server is configured to manage access to a plurality of game consoles by a plurality of remote console clients through a plurality of remote console servers using the console virtualization engines within the remote console servers.

31. The system of claim 30, wherein the global server is configured to communicate with the remote console clients to allow the remote console clients to locate a remote console server and associated game console and once located, to send and receive network packets to and from the located remote console server.

32. The remote console server of claim 19, wherein the remote console server is further configured to communicate with a global server to expose the remote console server and to manage its access.

33. The remote console server of claim 19, wherein the remote console server is configured to communicate with multiple game controller ports for a game console to allow multi-controller multiplayer game play on the game console.

34. The remote console server of claim 19, wherein the remote console server is configured to provide audio output and video output from a game console to more remote console clients than a number of players allowed by a game running on the game console.

35. The remote console server of claim 20, wherein the memory card emulation unit is configured to save a game configuration to a global server and to restore a game configuration from a global server.

* * * * *